United States Patent Office 3,095,372
Patented June 25, 1963

3,095,372
POWDERS FOR EXTINGUISHING FIRES
Lawrence H. Cope, Thurso, Caithness, Scotland, assignor to United Kingdom Atomic Energy Authority, London, England
No Drawing. Filed July 5, 1960, Ser. No. 40,530
Claims priority, application Great Britain July 6, 1959
9 Claims. (Cl. 252—2)

This invention relates to powders for extinguishing fires and has for object to provide a powder suitable for extinguishing fires of burning uranium, plutonium or thorium.

According to the present invention a powder for extinguishing fires of burning uranium, plutonium or thorium metal comprises a mixture of powdered inorganic chlorides and/or fluorides inert towards the burning metal, the mixture having a melting point below the melting point of the burning metal such that fusion of the powder takes place locally where the powder contacts the burning metal and that a frit is formed around the locally fused portion of the powder, whereby the ambient atmosphere is excluded from the metal and absorption of latent heat by fusion of the said locally fused portion of the powder exerts a chilling effect on the metal.

Also according to the present invention a method of extinguishing fires of burning uranium, plutonium or thorium metal comprises covering the burning metal with a blanketing mass of powder comprising a mixture of powdered inorganic chlorides and/or fluorides inert towards the burning metal, the mixture having a melting point below the melting point of the burning metal such that fusion of the powder takes place locally where the powder contacts the burning metal and that a frit is formed around the locally fused portion of the powder, whereby the ambient atmosphere is excluded from the metal and absorption of latent heat by fusion of the said locally fused portion of the powder exerts a chilling effect on the metal.

The following are examples of preferred mixtures suitable for extinguishing either a uranium or a plutonium fire:

*Example 1*                       Percent
NaCl _____ 15–25
KCl _____ 20–25
$BaCl_2$ _____ 50–55

This mixture has a melting point between 560° and 590° C.

*Example 2*                       Percent
NaCl _____ 35
KCl _____ 40
$BaCl_2$ _____ 25

This mixture is completely molten at 580° C.

*Example 3*                       Percent
NaCl _____ 20
KCl _____ 29
$BaCl_2$ _____ 51

This mixture is a eutectic and melts at 544.6° ±2° C.

*Example 4*                       Percent
LiF _____ 20
KCl _____ 20
$BaCl_2$ _____ 60

This mixture melts below 500° C. Further mixtures having similar low melting points may be prepared with up to 40% lithium fluoride, the balance being potassium chloride and barium chloride in suitable proportions.

The quantity of powder required is about 2 gms. for each gramme of uranium or plutonium present, if the uranium or plutonium is in massive form, and about 5 gms. for each gramme of uranium or plutonium present if the uranium or plutonium is in dispersed form.

The preferred method of dealing with a said fire is to pour the powder over the burning metal so that it forms a cone with the metal disposed at the centre of the base thereof. Sufficient powder should be employed so that the locally fused portion and the surrounding frit are separated from the ambient atmosphere by a considerable thickness of powder which assists in maintaining the integrity of the frit for exclusion of air from the burning metal. By using a powder with a melting point lower than the melting point of the burning metal, molten metal from an extinguished fire is more readily contained by the fused layer. This layer might otherwise crack on cooling and allow molten metal to break through, thus starting a further fire.

The mixture can be prepared by grinding the components together, but preferably the components are fused together before grinding to facilitate melting upon application to a fire. If the mixture is to be discharged from conventional gas-actuated cylinders the particle size of the powder is preferably controlled so that the powder is discharged readily. Satisfactory results have been obtained with powder entirely passing a No. 60 British Standard sieve, 50 to 90% of the powder being contained on a No. 200 British Standard sieve and not more than 10% passing through a No. 300 British Standard sieve. Caking of the powder may also affect ease of discharge although caked powder is still effective in extinguishing a fire. The possibility of caking may be reduced by the addition of magnesium stearate powder to the mixture. 2½% by weight of magnesium stearate is preferred. The powder needs, however, to be stored in sealed containers if moisture absorption is to be prevented entirely.

After a fire has been extinguished uranium or plutonium may be recovered from the residues by leaching with water to remove the soluble chlorides. Chloride-free residues are easily obtained for subsequent chemical processing.

I claim:
1. A powder composition for extinguishing fires of burning metals consisting essentially of a mixture of inorganic salts, said salts being potassium chloride in the range of 20%–40%, barium chloride in the range of 25%–60% and the remainder consisting of one of the salts of the group consisting of sodium chloride and lithium fluoride.

2. A powder composition for extinguishing fires of burning metals consisting essentially of prefused inorganic salts having a melting point of less than 590° C., said salts being potassium chloride in the range of 20%–40%, barium chloride in the range of 25%–55% and the remainder consisting of one of the salts of the group consisting of sodium chloride and lithium fluoride.

3. A powder according to claim 2 in which a water repelling agent is included.

4. A powder according to claim 3 in which the remaining salt is sodium chloride in the range of 15%–35%.

5. A powder according to claim 3 wherein the chlorides of sodium, potassium and barium are present in the following proportions: sodium chloride 15–25%; potassium chloride 20–25%; barium chloride 50–55%.

6. A powder according to claim 3 wherein the chlorides of sodium, potassium and barium are present in the proportions sodium chloride 35%, potassium chloride 40%, barium chloride 25%.

7. A powder according to claim 3 wherein the chlorides of sodium, potassium and barium are present in the proportions sodium chloride 20%, potassium chloride 29%, barium chloride 51%.

8. A powder according to claim 3 wherein the mixture consists of between 20% and 40% lithium fluoride, the balance being potassium chloride and barium chloride.

9. A method of extinguishing fires of burning metals, said method comprising covering the burning metal with a blanketing mass of powder composition consisting essentially of inorganic salts selected from the group consisting of the chlorides and fluorides of the alkali metals and the alkaline earth metals and prefused in such proportions so as to have a melting point below that of the burning metal such that fusion of the powder takes place locally where the powder contacts the burning metal and that a frit is formed around the locally fused portion of the powder, whereby the ambient atmosphere is excluded from the metal and absorption of latent heat by fusion of the said locally fused portion of the powder exerts a chilling effect on the metal.

References Cited in the file of this patent

UNITED STATES PATENTS

| | | |
|---|---|---|
| 1,968,984 | Binder | Aug. 7, 1934 |
| 2,388,014 | Sargent et al. | Oct. 30, 1945 |
| 2,396,604 | Reimers | Mar. 12, 1946 |
| 2,403,109 | Miller | July 2, 1946 |
| 2,768,952 | Anthony et al. | Oct. 30, 1956 |
| 2,781,577 | Smellie | Feb. 19, 1957 |
| 2,937,990 | Warnock | May 24, 1960 |

FOREIGN PATENTS

| | | |
|---|---|---|
| 494,598 | Great Britain | Oct. 28, 1938 |